United States Patent [19]

Winter

[11] Patent Number: 4,460,264

[45] Date of Patent: Jul. 17, 1984

[54] ELECTRONIC CAMERA WITH AUTOMATIC BATTERY SHUTDOWN

[75] Inventor: Arthur J. Winter, Encino, Calif.

[73] Assignee: W. Haking Enterprises, Ltd., Hong Kong, Hong Kong

[21] Appl. No.: 298,288

[22] Filed: Sep. 1, 1981

[51] Int. Cl.$^3$ .................. G03B 15/05; G03B 17/18; G03B 17/38

[52] U.S. Cl. .................. 354/419; 354/472; 354/484; 354/127.12; 354/266

[58] Field of Search .................. 354/32, 33, 34, 145, 354/266, 60 L, 127, 128, 139, 149

[56] References Cited

U.S. PATENT DOCUMENTS

| | | | |
|---|---|---|---|
| 4,086,582 | 4/1978 | Kiyohara et al. | 354/33 |
| 4,130,780 | 12/1978 | Ban et al. | 354/145 X |
| 4,192,598 | 3/1980 | Wakazono et al. | 354/145 X |
| 4,250,413 | 2/1981 | Kawasaki et al. | 354/60 R X |

*Primary Examiner*—Michael L. Gellner
*Attorney, Agent, or Firm*—Russell E. Hattis; Stephen R. Arnold

[57] ABSTRACT

An electronic timing circuit to be used in conjunction with photographic cameras using electronic exposure sensing and electrically actuated signal lights responsive to the exposure sensing causes automatic total electrical power shutdown if the camera is left unattended. No separate manual operation is necessary, the shutdown occurring within approximately half a minute after releasing the exposure button. Rundown of the camera battery via inadvertent failure of the operator to turn off the system is eliminated. The timer is turned on and system loads are connected in a latched state to the camera battery by partial depression of the exposure button. Adequate ambient illumination of the subject scene causes a photosensor to actuate a green signal light. Inadequate ambient illumination causes the photosensor to automatically actuate instead a red warning light and a flash tube charging circuit for a built-in flash tube, full charge being evidenced by reappearance of the green light. If the camera is pointed at a new scene of adequate ambient illumination during or after the charging process, charging stops automatically, and the flash trigger circuit is automatically disabled. An inexpensive trigger disabling circuit is disclosed. Two versions of the system are disclosed, one using bipolar comparators and capable of operation from a battery voltage of three volts, the other using CMOS comparators and requiring six volts. Both versions, in the shutdown state, place a total load of less than one microampere on the system battery, resulting in a battery life equal the shelf life if the camera is not used.

18 Claims, 3 Drawing Figures

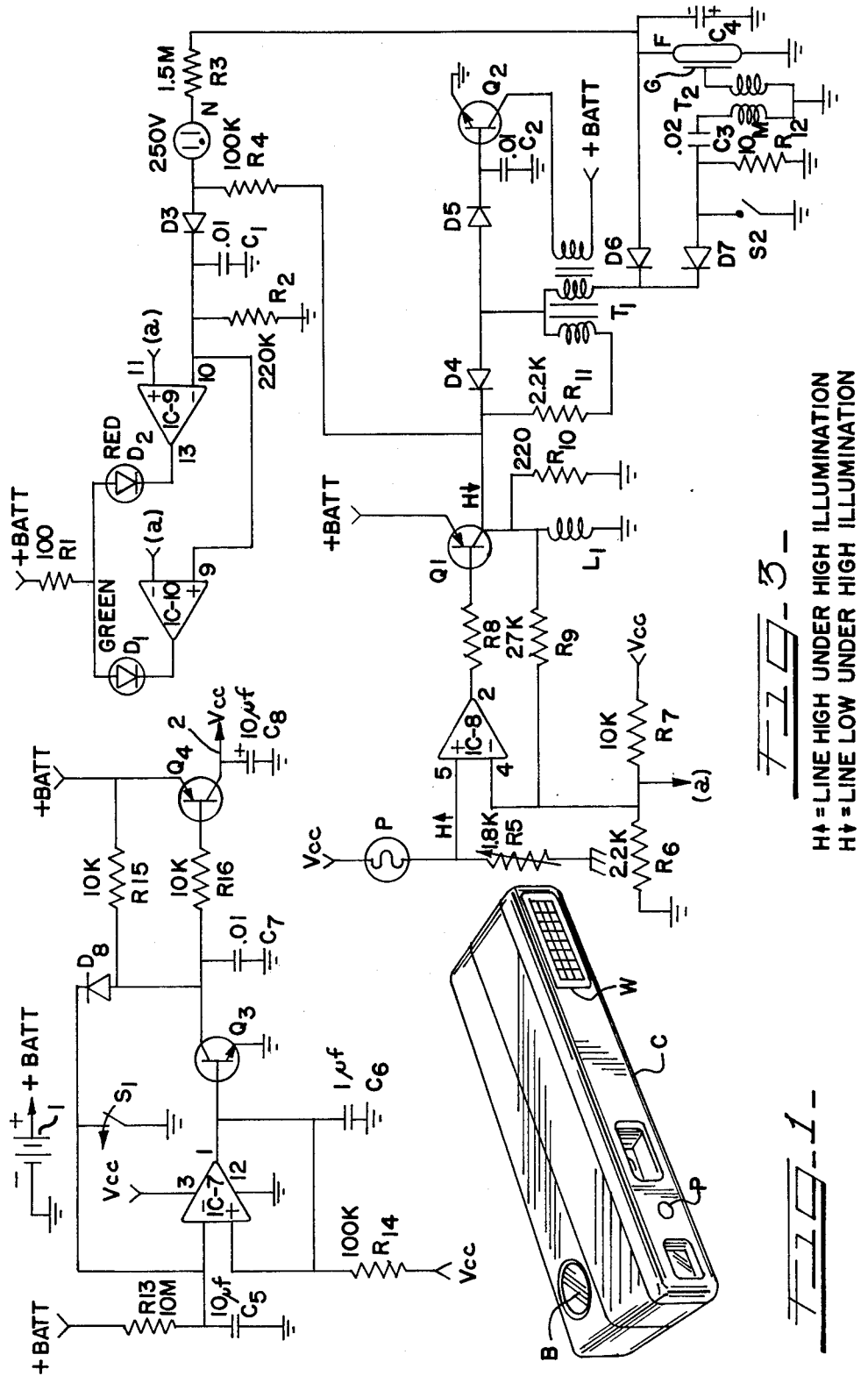

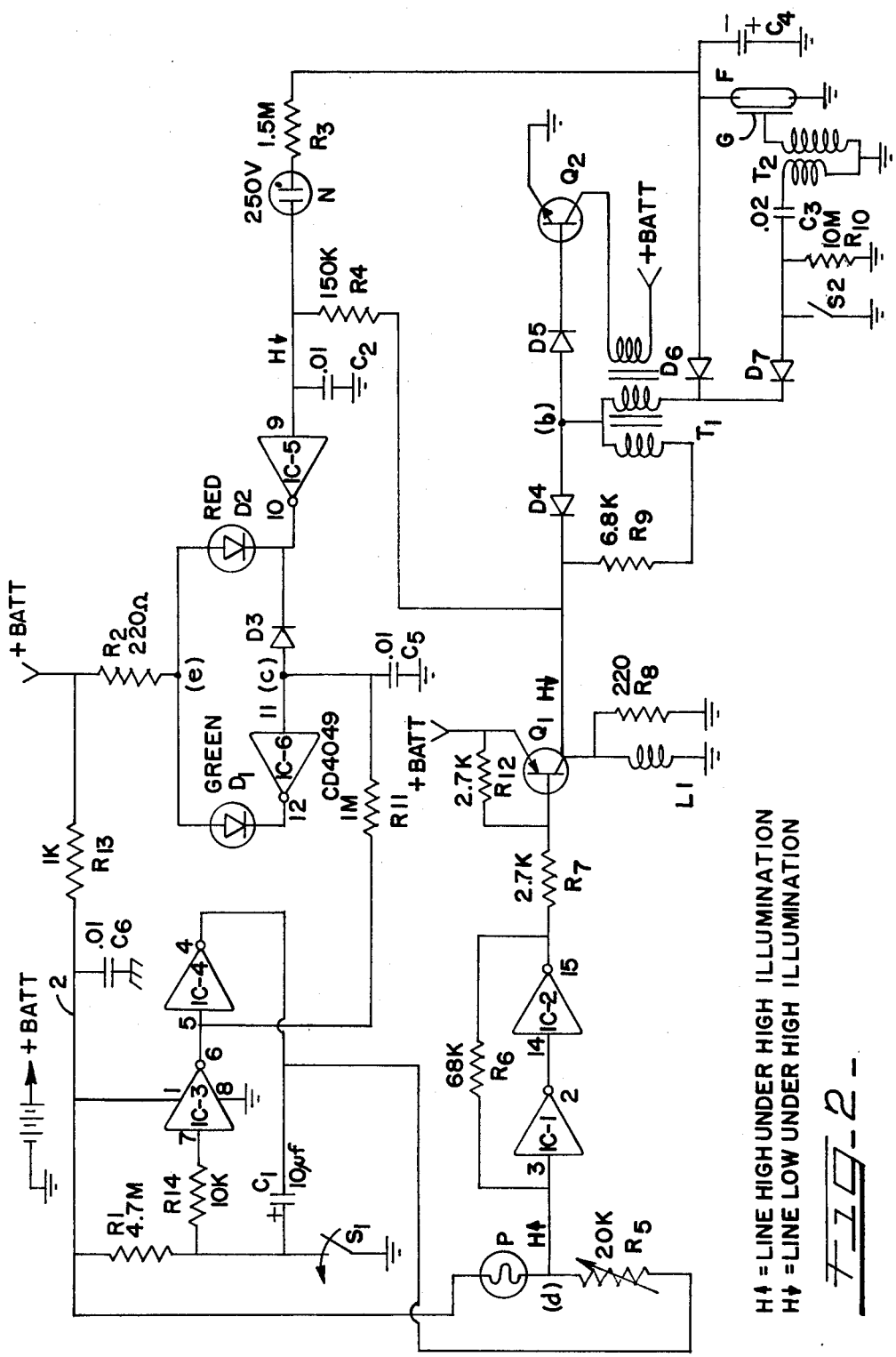
FIG-2-
H↑ = LINE HIGH UNDER HIGH ILLUMINATION
H↓ = LINE LOW UNDER HIGH ILLUMINATION

ELECTRONIC CAMERA WITH AUTOMATIC BATTERY SHUTDOWN

BACKGROUND OF THE INVENTION

Photographic cameras with integral electronic control circuitry are well established in the art. Such cameras customarily employ an internal system battery to power a variety of circuits such as exposure photosensors, electronic flash-charging circuits for build-in flash, flash-trigger circuits, and warning light circuitry indicating whether or not the ambient illumination is adequate for exposure, as well as the readiness state of the flash-charging circuit. Additionally, such circuitry may also be dedicated to automatically disabling the flash-trigger circuit responsively to ambient light sensors. All such circuitry draws power from the system battery to a greater or less degree. To preserve the life of the system battery when the camera is not in use, a manually actuated system battery on-off switch has been heretofore installed on the camera to be turned on to energize the circuitry for use, and to be turned off when the circuitry is not in use. A common source of accidental battery rundown arises from inadvertent operator failure to turn off the system battery on-off switch when the user ceases to use the camera.

A recently introduced camera having a bulky movable lens cover operates an on-off switch to a circuit powering on condition when pivoted into a lens uncovering position. The circuit involved energizes all of such circuits referred to above when the shutter release button is partially depressed and independently of the light condition detected by the photosensor circuit. A system of indicator lights informs the operator when ambient light is adequate, in which case flash triggering is disabled, and also indicates when the flash circuit is fully charged. If the user releases the shutter release button, all circuits continue to be fully powered and operative for a given period of the order of a minute, after which a low but significant power drain condition is established indicated by extinguishing of the indicator lights. The resulting low current drain condition, which is as much as 40 to 100 microamperes, undesirably reduces the operative life of the battery if the camera is inadvertently left in this low-current draining condition by failing to close the cover. In this system, as in other more conventional systems, some form of externally actuated mechanical switch is still necessary to effect power shutdown to preserve battery life.

It is an object of the invention to provide an electrically controlled camera which has no on-off switch and which includes an automatic shutdown system that places no significant battery drain (i.e., less than about one microampere) in the inactive state of the camera. It is a further object of the invention to provide one version of such a system that can operate at voltages as low as three volts so that system power can be provided by only two "AA" cells.

A further shortening of battery life in cameras with integral flash systems arises from the fact that irrespective of whether the flash charging circuit is switched on by a conventional separate switch or by system power-up initiated by partial depression of the shutter release button, the flash charging circuit continues to run whether flash is necessary or not. Some integral flash cameras inhibit flash triggering (but not the flash charging circuit) in high illumination situations by use of control signals derived from a photosensor. A significant degree of battery economy can be achieved if the charging circuit itself is automatically switched on or off by the exposure photosensor. This is achieved by one of the features of the invention by purely electronic means without the use of expensive relays.

The flash trigger disabling feature must be retained to prevent a charged flashing circuit from flashing if, for example, the user changes his mind and elects to photograph an adequately illuminated scene instead, or alternatively if the ambient illumination of the scene about to be photographed suddenly increases after the charging circuit has been switched on. Flash trigger disabling is customarily done either by using a high voltage silicon controlled rectifier (SCR) to inhibit discharge of a trigger capacitor, or alternatively by using an electrochemical switch similarly connected. Both approaches employ relatively expensive components. Accordingly, it is an object of the invention to achieve photosensor actuated flash trigger disabling by significantly less expensive means.

SUMMARY OF THE INVENTION

In accordance with one of the features of the invention, a battery operated power supply is provided in an electronic circuit-controlled camera which has no power on-off switch to be left inadvertently in an "on" condition when the camera is not in use. The power supply circuit is operated to a power-on condition preferably by the partial depression of the shutter release button to provide power to the various system loads of the camera battery, which may include photosensor exposure control circuitry, exposure condition indicating lights, and/or a flash charger and flash-trigger circuit. Both bipolar and CMOS versions of the power supply and electronic control circuits are disclosed. According to this feature of the invention, all system loads are effectively completely de-energized after a given timing period following release of the shutter release button such that the battery drain becomes practically zero (such as less than one microampere). This results in a battery life equal to the shelf life thereof, even though there is no manual on-off switch provided for this purpose.

According to one form of the invention, a timed monostable circuit made of CMOS devices energized directly from the system battery and requiring presently a battery source of more than three volts provides power to selected system loads and/or to provide control signals to other CMOS control circuits or bipolar power switching transistor upon partial depression of the shutter release button. Power continues to be supplied by the power supply for a limited period of time after shutter button release, whereupon the power supply and all other circuits revert automatically to a practically zero current drain state. All CMOS devices may remain connected to the system battery and latched in one of their two zero current drain states. All bipolar transistors may remain connected across the system battery, and may be latched by CMOS drive circuits to a zero current drain condition.

According to another form of the invention the same result may be accomplished in a lower voltage (e.g. 3-volt) version using integrated circuit bipolar comparators in place of CMOS elements. Here the comparators must be electrically disconnected from the system battery during shutdown because they draw significant current. This is accomplished by driving all comparators from a system bus connected to the system battery through a power supply switching transistor. The switching transistor is powered to an condition by partially depressing the shutter release button, whereupon the system bus becomes energized thereby supplying power to all comparators. One of these comparators serves as a time release latch, taking over the function of holding the power supply transistor in an on condition for a similar period after release of the shutter button. Automatic unlatching at the end of a predetermined period drives the power supply transistor to a cut-off condition and causes all comparators to be shut down, including the latch comparator itself. A holding capacitor holds the power supply in a power-off condition during the collapse of system bus voltage during the transition to a power-off condition, thereby avoiding possible conflicting output transitions from the bus-powered comparator during this period.

According to another feature of the invention, in a camera having an automatic power turn-off or power reducing feature after release of the shutter release button, unlike the described presently commercially available circuit where the flash charging circuit is always operative throughout the power-up period, the flash-charging circuit of the present invention is automatically turned on only when the photosensor indicates an inadequate ambient light condition, so that no charging current is drawn unnecessarily under adequate ambient light conditions. Since the charger circuit is a very heavy system load on the battery when it is operating, a significant economy of battery power is achieved.

According to another feature of the invention an inexpensive trigger disabling circuit prevents flash triggering whenever the charging circuit is cut off. This is done without employing a separately dedicated mechanical switch or other expensive components, and requires merely an extra diode and a bleeder resistor.

Thus, in either of two alternative versions, a power control and logic system serves to minimize battery drain either from inadvertent operator failure to turn off the system power, or from the normally employed free-running flash charging circuits. Both versions of the circuit represent cost-efficient use of readily available components, the CMOS version employing a commercial hex inverter and the bipolar version employing a commercial quad switching comparator.

Other objects, advantages, and features of the invention will become apparent upon making reference to the description to follow, the drawings, and the claims.

BRIEF DESCRIPTION OF DRAWINGS

FIG. 1 is a perspective view of the exterior of a representative electrically-controlled camera including a photosensor and an integral gas discharge flash tube;

FIG. 2 is a CMOS version of the circuit, containing a latching timer and power supply circuit, a latching photosensor control circuit for supplying control signals to signal light logic circuitry and to actuate a flash-charger circuit; and FIG. 3 is a three volt bipolar version of the circuit of FIG. 2 replicating substantially all functions thereof.

DETAILED DESCRIPTION OF EXEMPLARY FORM OF THE INVENTION

The circuits illustrated in the drawings are battery saving automatic power shut-down circuits for electrically powered photographic cameras employing internal light sensing circuitry, and particularly for cameras having integral electrically energized gas discharge flash lamps. Such cameras are typically provided with circuitry which automatically adjusts the lenses opening for proper exposure. Two alternative systems are proposed herein. One system employs discrete bipolar transistors and bipolar operational amplifiers, and is capable of operating off of a system battery voltage as low as 3 volts and requiring only two 1.5 v. AA batteries. The second system uses discrete bipolar transistors and CMOS inverters, and requires a higher voltage battery of more than three volts. Both systems are initiated from a power-off to a latched power-on state by depression of the camera shutter release button to a half-way position. Full power is then delivered to an internal light level sensor system which in turn actuates, through suitable logic, a pair of light emitting diodes, one green and one red, whereby the operator is informed whether or not the ambient light level is adequate for exposure.

If a green light is seen, the operator merely further depresses the shutter release button so as to actuate the shutter and thereby make the red light emitting diode is energized instead, and only then is a flash charging circuit turned on to commence charging a flash capacitor. If the operator continues to point the camera at the same scene or object, the red light will remain on until the flash capacitor is fully charged, at which point the red diode is de-energized and the green diode is energized to inform the operator that the flash capacitor is fully charged so that he may proceed with the exposure. If, alternatively, the operator decides not to make that particular exposure, or should he switch to a different scene of adequate light intensity so as not to require the flash system, the light sensing system illustrated automatically returns the flash charging circuit to a quiescent condition characterized by negligible current drain.

The camera circuits illustrated have no separate manual power on-off switch, and irrespective of the actions taken by the operator after depressing the shutter release button to its mid-range position, after complete release of the shutter button, a special timing circuit is activated which automatically and without any additional acts by the operator, shuts down all electrical systems in the camera to an essentially zero circuit drain condition after an elapsed time such as 30 seconds. In both versions of the system, the shut-down or power-off condition is characterized only by individual device leakage currents well down in the sub-microampere range, this current being represented by collector reverse leakage currents in the case of bipolar transistors, and by source to drain leakage currents in the case of CMOS devices. In all subsequent discussions and in the claims, all references to "shut-down" and "power-off" or simply "off" conditions are to be understood in this context. The term "significant current" is to be similarly understood. Similarly, the term "system load" will be used as a generic term to describe all circuit elements which in the power-on state draw significant current compared with the total system drain in the power-off condition.

Both preferred versions of the system employ five functionally similar, or in some cases identical, sub-circuits: A timer circuit, a flash tube power supply circuit, a flash trigger circuit, a photosensor amplitude comparator control circuit, and a display light logic circuit. Referring now to FIG. 1, a camera C having a flash window W behind which a flash tube is located, is actuated by depression of a shutter release button B mechanically connected by conventional means well known to the art to a shutter release mechanism and to one or more internal electrical switches which energize the various circuits which actuate the camera exposure mechanism. A photosensor window P' is provided for entry of ambient light.

FIG. 2 represents the circuit for the CMOS version of the system employing six CMOS inverters (IC-1 through IC-6) most advantageously in the form of a single integrated circuit such as the 4029. Each such unit is a device which is functionally a switch with an input terminal for accepting signals to control the switching state of an output terminal of the device. When a direct voltage is impressed across the power terminals, these devices have the property that the output terminal is alternatively connected to one power terminal or the other as the input signal is varied about a potential approximately mid-way between the potential applied across the two power terminals. Thus, if a load, such as a transistor, is connected between the output terminal and one power terminal, varying the input signal level will alternatively connect the load across power terminals or set it to a power-off condition. All six inverters in FIG. 2 are connected to have their power terminals permanently connected to the system battery. Their inputs, which draw negligible direct current, are all connected to place their respective loads in a cut-off condition during system shutdown. Under such condition, the total current drawn by the inverters from the system battery is their source to drain leakage current, a value typically at most an order of magnitude less than one microampere.

The circuit shown in FIG. 2 consists functionally of four sub-circuits. A latching timer consisting of two inverters IC-3 and IC-4 is activated by a shutter button activated switch S1 to provide electrical power to a photosensor P, and to provide a gating logic signal to other circuits throughout the period in which the shutter button is depressed at least half way, and for a finite period of time after the release thereof. Functionally this circuit is a form of monostable timing circuit. Photosensor P and inverters IC-1 and IC-2 form a light level sensing comparator which produces a logic signal under condition of weak ambient illumination to actuate a transistor switch Q1, which in turn sends a control logic signal to the remaining portions of the circuit, and which also serves to turn on a flash charging power supply circuit which uses transistor Q2 as the active element. Logic signals derived from the state of charge of a flash capacitor C4 as well as the previously mentioned logic signal derived from switching transistor Q1 responsive to light level are used as logic input signals to an indicator light logic circuit consisting of a green light emitting diode (LED) D1, a red LED D2, inverters IC-5 and IC-6, and a steering diode D3. The purpose of this indicator light logic circuit is to inform the operator of the status of the ambient illumination and of the state of readiness of the flash charging circuit immediately prior to exposure. Each of these sub-circuits will now be considered in detail.

System power is derived from a system battery 1 grounded at the negative end and supplying a positive voltage to the active elements of the system from its positive terminal. Power is supplied from the system battery to inverter IC-3 of the timing circuit through a decoupling resistor R13 running from the system battery to the common power terminal pin 1, here shown specifically referenced to inverter IC-3, however, it should be recognized that all six inverters are in a common integrated circuit, and than pin 1 of IC-3 is in fact the common positive power terminal of all six devices. Similarly, the return terminal to the system battery through system ground is shown as a connection to pin 8 of IC-3. This terminal also serves as the ground return of all six inverters. System line noise is supressed at terminal 1 of IC-3 by a filter capacitor C6. The connection between the decoupling resistor R13 and the power pin 1 of IC-3 will henceforth be referred to as the inverter power rail 2. Input pin 7 of inverter IC-3 is returned to the inverter power rail 2 through a surge protection resistor R14 and a timing resistor R1. A normally open switch S1 is connected between ground and the juncture of resistors R1 and R14. The power-on and timing process is initiated by depression of the button B (FIG. 1) to a half-way point, whereupon switch S1 is closed and remains closed during any further depression of the shutter button to actuate the shutter release mechanism (not shown). With switch S1 open and all circuits in a power-off state, the input pin 7 of inverter IC-3 is held at the system battery voltage, i.e. in a high condition. Because of the phase inverting properties of inverters, placing the input high causes the output pin 6 to be connected to ground, i.e. in a low state. Input 5 of IC-4, being directly driven from pin 6 of IC-3 is thus similarly pulled to a low state, thereby driving the output pin 4 to a high condition, replicating the state of input pin 7. Capacitor C1 connecting output pin 4 to the juncture of switch S1 and the timing resistor R1 is therefore in a discharged condition. A photosensor P, typically a cadmium sulfide photo-conductive element, is connected to draw power from the inverter power rail 2, the other end of the photosensor being returned to the juncture of capacitor of C1 with output pin 4 of inverter IC-4 through a variable sensing resistor R5. Since pin 4 of inverter IC-4 in the power-off state is in a high state, i.e. connected to the inverter power rail through power pin 1 of inverter IC-3, it follows that the photosensor and sensing resistor draw no current from the system battery during the shut-down condition. When shutter button B (FIG. 1) is half way depressed, a conventional mechanical linkage (not shown) forces switch S1 to a closed position, to remain thereafter during further travel of the shutter button. Closure of switch 1 thus brings pin 7 of converter IC-3 to ground potential, placing pin 6 in a high state and pin 4 at ground. This operation has two principal effects on other sub-circuits. As long as inverters IC-3 and IC-4 are in this configuration, pin 6 of inverter IC-3 will supply a high (positive) logic signal via resistor R11 connected between pin 6 and nodal point (c) of the logic circuitry associated with red and green light emitting diodes D2 and D1 respectively, and pin 4, being in a low or ground condition, thus pulls the lower end of sensing resistor R5 to ground, and causes current to flow from the inverter power rail 2 through the photosensor P and then to ground through the sensing resistor. Thus, in a power-on condition the potential of the junction of the photosensor P and the sensing resistor R5 will vary in accordance with the strength of illumination by ambient light falling on the photosensor P and changing its resistance.

The automatic time release feature of the timer circuit is initiated by release of the shutter button B (FIG. 1), thereby releasing switch S1 to open condition as, for example, when the user sets the camera down and ceases to use it. Capacitor C1, which was in a discharged state before opening switch S1, is now charged from the system battery through timing resistor R1, slowly raising input pin 7 of inverter IC-3 to increasing positive values. When input terminal 1 enters the active range of the inverter, typically at half the system rail voltage, output pin 6 is driven to ground and output pin 4 is raised to approximately 6 volts. By feedback action via capacitor C1 the input voltage at terminal 1 is rapidly driven to approximately 1.5 times the battery voltage, and the inverter pair IC-3 and IC-4 is latched into a toggled state with pin 4 high and the timer circuit restored to its initial quiescent power-off state wherein power is removed from the photosensing circuit and the diode light logic line feeding R11 goes to ground. By employing positive feedback around inverters IC-3 and IC-4 during the transition process, a rapid transition from the on to the off state is achieved. The time between release of switch S1 to the initiation of the transition to the shut-down configuration is set by the charging time of capacitor C1 through timing resistor R1. With representative values as shown of 10 microferads and 4.7 megohms, the timer between shutter buttom release and system shut-down will be in the general region of 30 to 50 seconds. Functionally the latched and subsequently self-releasing power supply are a form of astable timing circuit.

Returning now to the active mode of the camera after the shutter button has been depressed sufficiently to close switch S1 and energize the associated photosensor circuit with the lower end of sensing resistor R5 at ground and the upper end of the photosensor P at the power rail voltage, the voltage developed at the junction of photosensor P and resistor R5 will vary with the amount of light falling on the photosensor. The photosensor P is preferably of the photoconductive type, and therefore undergoes a decrease in resistance with increase in illumination level. Thus, at high ambient light levels, the potential of point (d) is high compared to its potential under weak illumination. The value of the potential at point (d) at chosen threshold level of illumination is set by adjusting the value of the sensing resistor R5. Point (d) is connected to the input pin 3 of inverter IC-1, the output pin 2 of inverter IC-1 in turn driving the input pin 14 of inverter IC-2, the output of inverter IC-2 being fed back to the input of inverter IC-1 through feedback resistor R6. Inverters IC-1 and IC-2 constitute a feedback amplitude comparator of conventional design. If enough illumination falls on photosensor P to raise the voltage applied to input terminal 3 of IC-1 above threshold the output terminal 15 of IC-2 will be latched into a high state returned to input terminal 3 by positive feedback. The latching action achieved by the feedback element R6 is necessary to prevent the potential of output terminal 15 from rapid unstable multiple switching from high to low states in the case of slightly varying ambient light levels near the switching threshold of the comparator. Thus, at high light levels the base of transistor Q1 connected to the output pin 15 of inverter IC-2 through resistor R7 is held at a high positive value, thereby disabling transistor Q1 by removing forward bias from the emitter, thereby disabling Q1 to a state where its total battery drain is equal only to its collector reverse leakage, a value much less than one microampere. Transistor Q1 is the principal control element for automatically turning on the flash tube charging circuit, as will be discussed subsequently. Transistor Q1 also serves to relay the status of the photosensing circuit to the diode display logic consisting of diodes D1 and D2. At high illumination levels, with transistor Q1 cut off, the collector of Q1 is isolated and is connected to ground through resistor R8. Logic line resistor R4 is thus pulled to ground at one end, thereby tending to pull input pin 9 of inverter IC-5 to a low state. An additional logic signal is communicated to input pin 9 of IC-5 indicating the charge status of a capacitor C4, connected across flash tube F with one terminal grounded. The active terminal of capacitor C4 as will subsequently be discussed, is charged to a high negative value during operation of the charger to a value in the neighborhood of approximately 300 volts. The active terminal of capacitor C4 is connected through resistor R3 and a gas discharge lamp N of approximately 250 volts firing potential to input pin 9 of inverter IC-5. If the voltage on an capacitor C4 is less than 250 volts lamp N will not ionize and no negative signal will be applied through it to pin 9 of inverter IC-5. The switching state of inverter IC-5 will thus be governed by either the grounding of resistor of R4 through R8, or alternatively by feedthrough of the flash capacitor voltage from C4 through resistor R3 and lamp N. Recalling that under high illumination conditions transistor Q1 is open, thereby pulling pin 9 of IC-5 to a low state through R4, it therefore follows that irrespective of the charge on capacitor C4, which would only serve to drive pin 9 below ground, under high illumination conditions the logical state of input pin 9 of inverter IC-5 is low. This situation will cause the green LED D1 to be actuated to indicate to the operator that adequate exposure is available for exposure without flash assist. The red light emitting diode D2, deriving its power from the system battery through R2 connected to its anode, must have its cathode at ground to be activated. With input terminal 9 of inverter IC-5 low, output pin 10, to which the cathode or diode D2 is connected, is in a high state. Therefore, diode D2 is disabled under high light conditions. Recalling that throughout the power-on condition output pin 6 of inverter of IC-3 is high, communicating through resistor R11 through node (c) to input terminal 11 of inverter IC-6, it follows that output pin 12 of IC-6 is thus in a low state, i.e. at ground potential. The green LED D1, having its anode connected to R2 and its cathode to output pin 12 of inverter IC-6, is thus in a forward biased condition and therefore active, indicating to the operator that it is safe to proceed with the exposure. Diode D3, connected with its cathode to output pin 10 of inverter IC-5 and its anode to input pin 11 of inverter of IC-6 is not forward biased and is therefore blocked.

If the light sensing derived at the photosensor P is indicative of inadequate illumination, then, as previously described, output terminal 15 of inverter IC-2 will be driven low, thereby pulling the emitter to base junction of transistor Q1 into a forward conducting condition and biasing Q1 into a conducting state, pulling the collector of Q1 high, and resistor R4 will attempt to pull the input terminal 9 of inverter IC-5 into a high state. If this occurs, then output terminal 10 is driven low, thereby energizing the red diode D2 and also drawing diode D3 into a forward conducting condition. Input pin 11 of inverter IC-6 is thus pulled low, thereby raising its output pin 12 to a high state so as to disable the green diode D1. Thus, to the extent that energizing the transistor Q1 can pull the input terminal 9 of inverter IC-5 high through R4, the red warning light will turn on to alert the operator that exposure should not immediately be made. Transistor Q1 will successfully hold the input terminal of inverter IC-5 high so as to energize the red warning diode D2 so long as there is insufficient negative charge on capacitor C4 to override this bias action through resistor R3 and indicator lamp N. If, however, capacitor C4 is fully charged as, for example, from a prior charging operation, or alternatively as a result of a new charging operation involving energization of the oscillator transistor Q2, then the gas tube N will ionize and the input terminal 9 will be pulled into a low state to extinguish the red diode D2 and activate the green diode D1, indicating that a full strength flash exposure can be made. In such a case, the flash tube F will be fired to provide illumination for the exposure, as will be discussed next.

As previously described, the low illumination condition causes transistor Q1 to be biased to the conducting state. Transistor Q1 and associated circuit elements form an oscillator circuit whose oscillating condition is enabled or disabled by control current signals in the bias control circuitry associated therewith. An optional aperture control coil L1 connected across resistor R8 may be actuated to control camera aperture by means well known to the art. Resistor R8 serves to damp oscillations induced by the switching process. Transistor Q2 is the active element of the high voltage capacitor charging circuit. It is an NPN power transistor with a grounded emitter and having its collector returned to the system battery through one winding of an oscillator transformer T1. When a low ambient illumination condition causes transistor Q1 to be switched on, thereby raising its collector to a substantial positive voltage, this positive signal is fed through biasing resistor R9, through a feedback winding of transformer T1, then through reference node (b) to the anode of offset diode D5 having its cathode connected to the base of transistor Q2. Diode D5 is thus biased in the forward condition, causing the base of Q1 to be raised above ground, thereby turning on transistor Q1 to an active state to produce an oscillating condition. Diode D5 is inserted solely to produce an additional constant voltage drop between point (b) and the base of transistor Q2. The purpose of this offset bias will be disclosed shortly. A third high voltage winding of transformer T1 serves to charge the flash tube capacitor C4 to a negative potential through a high voltage rectifier diode D6. Normal operating voltage of the flash tube F is in the vicinity of 300 volts. Alternatively, if transistor Q2 is shut down by switching off transistor Q1 responsive to a high illumination sensing at photosensor P, resistor R9 is grounded through resistor R8. Control diode D4, with its cathode connected to the collector Q1 and its anode connected to reference node (b) serves to insure that node (b) cannot rise above approximately 0.7 volts, the forward drop of the diode. For normal operation of the oscillator it is clear that the potential at point (b) must be that of the forward biased diode D5 added to the forward emitter potential drop of transistor Q2, i.e. approximately 1.4 volts. Returning diode D4 to ground, however, insures that point (b) can in no case exceed the forward voltage drop of diode D4, hence, the potential at this point is below the sustaining potential of the base of transistor Q2, and therefore the oscillator is biased into a shut-down condition. Here again, in the shut-down condition transistor Q2 will only drain collector reverse leakage current from the system battery. Thus, under high illumination conditions the oscillator is shut off, and under low illumination conditions it is automatically turned on to charge the flash capacitor C4.

The flash tube trigger circuit employs a separate high voltage rectifier diode D7 with its cathode connected to the cathode of the flash rectifier D6, and with its anode connected to trigger capacitor C3, which in turn is returned to ground via the primary winding of trigger transformer D2. Turning on the oscillator Q2 thus causes charging of the trigger capacitor C3. A normally open synchronization switch S2 of conventional design attached to the shutter mechanism grounds the anode of diode D7. Closure of switch S2 during exposure discharges capacitor C3 rapidly through the primary winding of transformer T2, thereby making a high voltage surge in the secondary winding connected to a trigger electrode G at a flash tube F. In a departure from the conventional arrangement wherein a common high voltage rectifier is used to service both charging capacitors C4 and C3, by inserting a separate charging rectifier diode D7, and by providing a shunt leakage path across the trigger capacitor in the form of a 10 meghom resistor R10, the charge on the trigger capacitor C3 bleeds off in a matter of a few tenths of seconds after oscillator transistor Q2 is shut down. By this means the trigger circuit is effectively disabled and cannot trigger a flash tube discharge under those situations in which the operator prepares to take a low illumination level picture requiring charging of the flash lamp capacitor C4, changes his mind, and attempts instead to take a picture of a subject under high illumination. Without this automatic disabling feature of the trigger circuit, the flash tube would invariably be triggered in such circumstances, possible giving rise to overexposure. By providing an independent rectifier and a bleeder resistor the trigger circuit is disabled without necessitating employment of more expensive components such as an SCR or a special mechanical switch. As previously discussed, when the flash capacitor C4 is fully charged, pin 9 of inverter IC-5 is held strongly negative, thereby causing actuation of the green diode light D1 informing the user that camera is ready for exposure.

Summarizing, the electronic circuitry of the camera is activated into a power-on condition by partial actuation of the shutter release button. This condition persists for a period of approximately 30 seconds after subsequent release of the shutter button. At this point the circuitry enters an interrogation phase wherein photosensor circuitry interrogates the light level and communicates status information to two indicator lamps visible through the camera viewfinder. If the light level is adequate for an exposure without flash assistance, a green light appears, signalling to the operator that he may proceed with the exposure. If insufficient light is detected, a red light comes on, and immediate automatic actuation of the flasher charging circuit takes place. With the camera held trained on the scene to be photographed, charging proceeds over the time of the order of 5 to 20 seconds, after which the red light goes out and the green light comes on, indicating that the operator may proceed with his exposure. Depression of the exposure button to the shutter release condition then initiates a flash exposure. Aternatively, should adequate charge still remain on the flash capacitor from a prior charging operation, the green light simply remains on throughout the actuation of the shutter button, and the exposure proceeds by means of the assisting flash. Alternatively, if the operator decides to photograph a different subject characterized by adequate ambient illumination, upon pointing the camera at the subject and depressing the shutter actuating button the flash charging circuitry remains inoperative and disabled, the green light comes on, and the operator may proceed to take the picture without flash assist, and without the battery drain concomitant to the charging operation. Within a period of approximately 30 seconds after the shutter button is released by the operator, the entire system enters a total power shut-down configuration.

In the shut-down state the input of inverter IC-3 is held high and its output low, thereby holding the input of inverter IC-6 low and thus disabling the green LED D1. The photosensor P and its sensing resistor R5 are both held at the potential of the system battery and draw no current. The inverter pair IC-1 and IC-2 are thus are in a state wherein the base of transistor Q1 is at battery potential to cut off transistor Q1, and thus cut off the oscillator transistor Q2 as well. The input to inverter IC-5 is low, thereby disabling the red LED D2. Thus, all CMOS units are set to a low current drain condition, both indicator diodes are disabled, the photosensor current is terminated, and the two discrete transistors Q1 and Q2 are biased so that the only current drain through them is collector reverse leakage. Total current drain from these sources is less than one microampere using a system battery of 6 volts, resulting in total power economy of the system battery. Although this circuit is disclosed as employing six CMOS inverters, each inverter consisting of a CMOS switch, it will be evident to those of ordinary skill in the art that identical behavior may be achieved by employing matched pairs of discrete devices, e.g. p channel and n channel MOS (metal-oxide-semiconductor) devices with their gate electrodes connected together.

The circuit shown in FIG. 3 represents a purely bipolar transistor approach to the same problem. It is capable of operating from a three-volt system battery. The solution here is somewhat more complex, in that the timer itself involves bipolar transistors, which unlike CMOS devices require significant consistant current drain for their operation. The timer circuit, which uses comparator IC-7, must be self-enabling and self-disabling with respect to system power drain. Overall examination of FIG. 3 shows that a total of four differential operational amplitude comparators IC-7 through IC-10 are employed. They are commercially available in a single package integrated circuit such as the LM 339. These bipolar comparators are of the switching type, wherein the output terminal is simply a direct connection to the unloaded collector of an n-p-n output transistor.

The overall functions of the sub-circuits are substantially identical with those of their counterparts in the CMOS version shown in FIG. 2. A manually latched and automatically released power supply circuit employs amplitude comparator IC-7, switching transistor Q3, and a power switching transistor Q4, which delivers power at its collector to a system bus 2 used to power all comparators, as will subsequently be discussed. A photosensor P and sensing resistor R5 are used in conjunction with level comparator IC-8 to actuate switching transistor Q1 into operative and inoperative states according to light sensings. The flashing charging circuit and trigger circuits are identical with the CMOS version. The indicator light drive circuit logic is accomplished by means of amplitude comparators IC-9 and IC-10 in conjunction with logic diode D3.

Considering first the latching power supply circuit, a system battery 1 with its negative terminal grounded supplies a positive voltage directly to the emitter of an n-p-n transistor Q4 supplying a positive voltage VCC from its collector to a system power bus 2. All four comparators draw their power from this bus 2 via pin 3, at comparator IC-7. Similarly, all comparator ground returns are via pin 12 of comparator IC-7. In the power-off condition transistor Q4 is switched off by means to be discussed subsequently, thereby removing all comparators as loads on the system battery. Transistor Q4 is initially switched to a conducting condition by employment of a biasing network consisting of resistor R15 connected to the system battery and leading to the base of transistor Q4 through R16 and also to the anode of diode D8. The cathode of D8 is connected to ground by closure of normally open switch S1 upon depressing the shutter button half way, as before. This places diode D8 at ground and biased in the forward direction, thereby drawing the base of Q4 in the forward biased direction through R16, and turning transistor Q4 on to supply the voltage VCC to the system bus 2. Power is thus immediately supplied to all four comparators, as well as to one end of the photosensor P. Also, immediately upon closing switch S1, the inverting input terminal of comparator IC-7, which is connected to the cathode of diode D8, is grounded through switch S1. The system bus voltage VCC is fed through R14 to the non-inverting input terminal of IC-7. The output pin 1 of comparator IC-7 drives the base of n-p-n transistor Q3 with its emitter grounded. Output pin 1 of comparator IC-7 is also connected directly back to the non-inverting input terminal. Since the potential of the non-inverting input of comparator IC-7 exceeds that of inverting terminal, the output stage transistor of the comparator is cut off, and thus presents no load to the circuit via pin 1. Thus, the base of transistor Q3 is held in a high state by the direct connection to the comparator bus through resistor R14 and is forward biased with respect to the emitter, turning transistor Q3 on, thereby taking over the function of switch 1, in that the emitter to base junction of transistor Q4 is held in a forward biased active condition through resistor R16.

Upon opening switch S1 a timing operation is initiated. By means of a timing network consisting of R13 and C5, R13 connects capacitor C5 to the system battery to charge it up from ground potential. The juncture between resistor R13 and capacitor C5 is connected to the inverting terminal of comparator IC-7, and as capacitor C5 proceeds to charge through resistor R13 in the positive direction the inverting input terminal of comparator IC-7 rises to increasingly positive values until the potential at the non-inverting terminal is exceeded, at which point the comparator output stage transistor is switched on, thereby dropping the potential of pin 1 below the base to emitter voltage of transistor Q3, whereupon Q3 is switched to an off state. Since S1 is no longer closed, transistor Q4 is switched to an off state, and the voltage of the comparator bus 2 rapidly drops to zero. A holding capacitor C6 installed between the base of transistor Q3 and ground serves to hold the base of transistor Q3 at a low potential to insure that is remains cut off irrespective of any momentary transient switching of the output stage of comparator IC-7 while the bus voltage VCC supplied to power the comparator is collapsing to zero. By this means, transistors Q2 and Q4 are held in an off condition throughout the collapse process, at the end of which time the entire timer is in a disabled state, and draws current only through the collector reverse leakage of transistors Q3 and Q4. Thus, the timer shuts itself down completely at the end of a time period set by the charging time of capacitor C5 and resistor R13, a time of the order of 30 to 50 seconds. All other bipolar comparators, i.e. IC-8, IC-9 and IC-10, which are powered through pin 3 of the common chip are similarly shut down simultaneously with the timer. The photosensing circuit consisting of the photo-conductive element P, and sensing resistor R5 are similarly disabled by the shut-down operation and draw no current under such conditions.

In the power-up state comparator IC-8 serves to turn switching transistor Q1 off under high illumination conditions to disable the power supply oscillator transistor Q2 as before. Under such high illumination conditions the non-inverting input terminal of comparator IC-8, connected to the juncture between the photosensor P and the level set resistor R5, is held at a high state. A reference voltage derived from a divider network consisting of resistors R7 and R6 powered from the system bus 2 supplies a voltage to the inverting input of comparator IC-8 equal to approximately 20% of the positive comparator rail voltage VCC. Under such high illumination conditions the potential at the non-inverting input will exceed the potential applied to the inverting input, with the result that the output switch of comparator IC-8 and thus terminal 2 will be in an open circuit condition. The base of transistor Q1 is connected through resistor R8 to terminal 2 of comparator IC-8, from which it follows that under high illumination conditions the base circuit of transistor Q1 is in an open-circuit condition and Q1 is therefore in a cut-off condition, as was the case under similar circumstances in the case of the CMOS version of the circuit. A feedback resistor R9 connected from the collector of transistor Q1 to the inverting input of comparator IC-8 is of no effect in this situation. As in the case of the CMOS circuit previously described, under such conditions the sensing information signal supplied from the collector of switching transistor Q1 via resistor R4 to the diode light logic circuit results in a ground condition at the lower terminal of resistor R3. Diode light logic is supplied as before as a combination of two signals, one derived through resistor R4 from switching transistor Q1, and the other through resistor R3 and indicator lamp N fed by the flash capacitor F. Their common terminal is the anode of diode D3, whose cathode is returned to ground through resistor R2 under high illumination conditions. The anode of diode D3 is either effectively grounded through R4 or driven negative through R3, in either case being in an inactive condition, resulting in a zero current condition through resistor R2. The juncture between the cathode of diode D3 and resistor R2 is fed to the inverting input of comparator IC-9 and to the non-inverting input of comparator IC-10. Both remaining input terminals of these two comparators are brought back to the system reference potential of point (a) of the resistive divider consisting of resistors R6 and R7, thereby placing these two terminals at a constant positive value of a few volts. Under such conditions the output of comparator IC-9 will be in an open circuit condition, causing pin 13 to float and thereby blocking current flow from the system battery through resistor R1 and through the red light emitting diode D2. Conversely, the non-inverting terminal of comparator IC-10 is at ground, whereas the inverting terminals is positive, resulting in a closure of the output transistor of comparator IC-10, thereby allowing an energizing current to flow from the system battery through R1 and through the green light emitting diode D1 to ground, thereby indicating an adequate ambient light condition.

For low light level conditions requiring flash energization a relatively low potential is seen at the inverting input of comparator IC-8, in which case the positive potential applied to pin 4 predominates, resulting in a switch-on condition at the output pulling output pin 2 essentially to ground, thereby pulling transistor Q1 into forward conduction and causing energization of the flash charging circuit as previously described. The feedback action produced by resistor R9 fulfills the same function as resistor R6 in FIG. 2, and provides a positive separation of triggering levels of comparator IC-8 to achieve the same immunity to short term variation in sensed light levels arising in marginal illumination situations because of slight movements of camera, or from other causes. Under low illumination conditions the switching on of transistor Q1 initiates the charging operation of the flash circuit, and simultaneously applies a positive logic signal to the anode of diode D3 through resistor R4. Diode D3 is thus forward biased, and current flows through diode D3 to ground via resistor R2, thereby putting a positive potential on the inverting input of comparator IC-9 to actuate the red light emitting diode D2, and putting the same positive potential on the noninverting input of comparator IC-10 so as to disable the green light emitting diode D1, thereby warning the operator that time for a charging operation must be allowed for. Subsequent charging of the flash capacitor C4 overrides the logic signal applied through R4 and thus ultimately reverses the states of the diode lights D1 and D2 to actuate selectively the green light.

In the shut-down state all comparators have their power source removed, since VCC is zero. Since each comparator output terminal is a direct connection to the unloaded collector of an output state n-p-n switching transistor, after VCC drops to zero all output terminals may be represented as reverse biased diodes with respect to any positive signal voltage levels applied thereto. Thus, both signal diodes D1 and D2 are disabled, as is the bias current to transistor Q1. Thus, transistor Q1 is cut off, as is the oscillator transistor Q2. With VCC at zero, transistor Q3 is cut off, and bias resistor R15 holds transistor Q4 cut off. Since the system bus voltage VCC is zero, no current is drawn by the photosensor circuit. A slight leakage occurs into the inverting input of comparator IC-7 via resistor R13. With R13 equal to 10 megohms and a 3-volt system battery this has a maximum value of ⅜ microampere. Total system current drain in the shut-down condition is less than one microampere.

In overall function, the bipolar and CMOS circuits as shown in FIGS. 2 and 3 respectively, are identical. Both systems automatically give rise to total power shut-down without actuation of any external means. A camera left unattended will shut itself off completely, and will not run down the system battery.

Either system may be readily extended to cover more refined control systems. Thus, for example, the camera-to-subject distance may be obtained as a variable analogue signal level derived by well-known means from the lens focusing system. Such a signal may be used to trigger a range comparator similar to the disclosed photosensing comparator, and if the range so detected exceeds a predetermined value implying that the flash will be inadequate, a simple gating logic actuated such a range comparator simply disables the green diode. Thus, the red charging light comes on, but never turns off, thereby warning the operator that the flash unit will be inadequate.

While for the purpose of illustration, various forms of this invention have been disclosed, other forms thereof may become apparent to those skilled in the art upon reference to this disclosure and, therefore, this invention shall be limited only by the scope of the appended claims. In the appended claims the term "signal" is to be broadly construed as meaning alternatively a voltage condition, a current condition, or an impedance condition applied to a control line or to a terminal. Thus, in the bipolar circuit shown in FIG. 3 voltage signals are applied to the input terminals of comparator IC-8, whereas different impedance conditions result therefrom at its output, resulting in either a grounding or an open circuit "signal" being applied to resistor R8 at pin 2.

I claim:

1. In an electrically powered camera having a battery, a manually actuatable non-latching switch having a stable power-off condition to which position said switch reverts when externally applied actuating pressure is removed from said switch, and at least one electrical system load to be associated with the picture taking operation and to be actuated to a power-on condition by actuation of said switch to an energizing power on condition, the improvement comprising:

an MOS timed monostable circuit powered by said battery and having a first output terminal connected to said at least one system load, said monostable circuit having two output states responsive to the state of said switch, an unstable first output state directly switching battery power to said at least one system load, and a stable second state causing a power-off condition to said at least one system load, said astable circuit actuated from second state to said first state by actuating said non-latching switch to said power-on condition, said monostable circuit remaining in said first state throughout actuation of said non-latching switch and for a given period of time after said reversion of said switch to said stable second state, said monostable circuit reverting to said power-off state after passage of said given period of time, thereby disconnecting battery power from said at least one system load, said monostable circuit when there are one or more additional system loads providing different control signals during said first and second states thereof to control a circuit forming part of each additional system load, said monostable circuit effecting a nonconducting condition of all system loads by said disconnecting of electrical power and by the control signal present during said second state thereof, said timed astable timing circuit drawing no significant current from said battery when in said second state, and said non-latching switch being the only manually actuated switch controlling the application of battery power to said camera.

2. The camera of claim 1 wherein one of said system loads is an electrically powered exposure photosensing circuit.

3. The camera of claim 1 wherein said circuit of each additional system load is an MOS circuit.

4. The camera of claim 2 wherein one of said system loads is an integral flash tube and charging circuit for providing flash illumination during exposure, said camera including:

first control means responsive to said photosensing circuit for providing control signals indicative of the level of ambient illumination;

first disabling means for disabling said charging circuit to effect a zero current cutoff condition in response to a control signal from said first control means indicating adequate ambient illumination, and for enabling said charging circuit to operate in a charging condition in response to a control signal from said first means indicating inadequate ambient illumination.

5. The camera of claim 4 further comprising:

second control means responsive to an inadequate charge state of said charging circuit and to a control signal from said first control means indicative of inadequate ambient illumination for providing a warning control signal indicating simultaneous inadequate charge and inadequate ambient illumination;

warning means responsive to said warning control signal condition for warning the operator that flash exposure is necessary and that said flash circuit is not fully charged; and first indicating means for indicating to the operator that a picture can be taken because of adequate ambient illumination or because said charging circuit is fully charged in response to either a control signal from said first control means indicating adequate ambient illumination or in response to a control signal from said first control means indicating inadequate illumination when said charging circuit is fully charged.

6. The camera of claim 5 wherein said charging circuit includes a capacitor connected to deliver power to the terminals of said flash tube, a first rectifier, and a source of alternating electrical voltage connected to charge said capacitor through said first rectifier, said flash tube having a trigger electrode to which a triggering voltage is to be applied, said camera further comprising:

a second rectifier connected to charge said trigger capacitor from said source of alternating voltage;

a trigger transformer having an input winding and a secondary winding connected to energize said trigger electrode;

switching means connected to discharge said trigger capacitor through said primary winding during shutter actuation; and a bleeder resistor connected to continuously discharge said trigger capacitor at a rate substantially less than its charging rate through said second rectifier, said bleeder resistor serving to bleed down said trigger capacitor when said source of alternating voltage is shut down by said first disabling means and thereby prevent subsequent actuation of said switching means from triggering said flash tube during said shutdown.

7. The camera of claim 1 or 3 wherein said MOS astable circuit employs integrated circuits in the form of CMOS inverters, said inverters numbering at most two.

8. The camera of claim 2 wherein said photosensing circuit employs integrated circuits in the form of CMOS inverters, said inverters numbering at most two.

9. The camera of claim 5 wherein said first indicator means includes a first electrical light means actuated directly by a first CMOS inverter, said warning means includes a second electrical light means actuated directly by a a second CMOS inverter, said first and second inverters respectively responding in the system power-on condition to a control signal from said first control means indicating adequate ambient illumination and said warning control signal.

10. The camera of claim 1 wherein said camera includes at least a first and second system load, said first load being connected at one terminal thereof to the positive terminal of said battery, said second load being connected at one terminal thereof to the negative terminal of said battery, said MOS monostable circuit employs integrated circuits in the form of at least two CMOS inverters, a first one of said at least two inverters being driven to connect the other terminal of said first load to the negative terminal of said battery when in said unstable state and breaking said connection in said stable state, a second one of said at least two inverters being driven to connect the other terminal of said second load to the positive terminal of said battery when in said unstable state and breaking said connection in said stable state.

11. The camera of claim 10 wherein said first inverter is connected to drive said second inverter, said monostable circuit having a feedback loop connecting a capacitor between the output of said second inverter and the input of said first inverter to provide a positive feedback latching action to latch said pair of inverters in said stable power-shutdown state after a time governed by the capacitance value of said capacitor.

12. In an electrically powered camera having a battery, control circuitry for actuating from said battery at least one electrical system in said camera, said system including photosensing circuitry for sensing adequacy of ambient scene illumination, indicator means responsive to said photosensing circuitry for indicating inadequate ambient illumination, and an integral flash tube and charging circuit for providing flash illumination during exposure, said charging circuit including an oscillator which generates an a.c. voltage coupled through rectifier means to a capacitor which discharges through a flash tube, said a.c. voltage being much greater than the voltage of said battery, said oscillator including a current control device having load terminals and a control terminal, the improvement comprising:

control means responsive to said photosensing circuit for providing control signals responsive to differing levels of ambient illumination; and disabling means for disabling said charging circuit by feeding a load current cut-off signal to the control terminal of said oscillator current control device in response to a control signal condition from said control means indicating adequate ambient illumination, and by feeding a load current turn-on signal to the control terminal of said oscillator current control device, enabling said charging circuit to operate in a charging condition in response to a control signal from first control means indicating inadequate ambient illumination.

13. The camera of claim 12 further comprising:
second control means responsive to an inadequate charge state of said charging circuit and to a first control signal from said first control means indicative of inadequate ambient illumination by providing a warning control signal indicating simultaneous inadequate charge and inadequate ambient illumination; and warning means responsive to said warning control signal from said second control means for warning the operator that flash exposure is necessary and that said flash circuit is not fully charged.

14. A flash tube trigger circuit for a flash tube energizing circuit having a flash tube, a flash capacitor connected to deliver power to the terminals of said flash tube, a first rectifier, and a source of alternating electrical voltage connected to charge said capacitor through said first rectifier, said flash tube having a trigger electrode to which a triggering voltage from said trigger circuit is to be applied, said trigger circuit comprising:

a trigger capacitor;

a second rectifier connected to charge said trigger capacitor from said source of alternating voltage;

a trigger transformer having an input winding and an output winding connected to energize said trigger electrode;

switching means connected to discharge said trigger capacitor through said input winding during shutter actuation to supply said triggering voltage to said triggering electrode; and a bleeder resistor connected to continuously discharge said trigger capacitor are at a rate substantially less than its charging rate through said second rectifier, said bleeder resistor serving to bleed down said trigger capacitor when said source of alternating voltage is shut down and thereby prevent subsequent actuation of said switching means from triggering said flash tube during said shutdown, said first and second rectifiers connected so that with said trigger capacitor in a charged state, said source of alternating voltage inoperative, and said flash capacitor in a charged state, at least one of said rectifiers is biased in a blocking direction to prevent said flash capacitor from discharging through said trigger circuit.

15. The circuit of claim 14, wherein said trigger circuit and said flash tube energizing circuit are part of an electrically operated camera, said camera having photosensing control means for providing control signals indicative of adequate ambient scene illumination, and means responsive to said control signals for automatically enabling or disabling said source of alternating electrical voltage according to whether flash exposure is necessary or not.

16. The camera of claim 9 wherein said first and second indicator means employ at most only two CMOS inverters.

17. In an electrically powered camera having a battery, a manually actuatable non-latching switch having an unstable power-on condition and a stable power-off condition to which said switch reverts when externally applied actuating pressure is removed from said switch, and at least two electrical system loads to be associated with the picture taking operation and to be actuated to a power-on condition by actuation of said switch to said power-on condition, the improvement comprising:

a timed monostable circuit responsive to actuation of said switch and having a stable and an unstable state, said circuit being connected at all times to said battery and formed by MOS or the like current control means which draw practically no battery current when said monostable circuit is in said stable state thereof, said circuit having first and second output terminals for supplying power from said battery to said at least two system loads, said monostable circuit when in said unstable state directly switching battery power to said output terminals, said first output terminal supplying battery power in said unstable state to system loads connected between said first output terminal and one terminal of said battery, said second output terminal supplying battery power in said unstable state to system loads connected between said second output terminal and the other terminal of said battery, said monostable circuit being actuated from said stable power-off state to said unstable power-on state by actuation of said non-latching switch to said power-on condition, said monostable circuit remaining in said unstable state throughout actuation of said non-latching switch to said power-on condition and for a given period of time after reversion of said switch to said stable power-off condition thereof, said monostable circuit reverting to said stable power-off state after passage of said given period of time, so as to disconnect battery power from said system loads, said non-latching switch being the only manually actuated switch controlling the application of battery power to said camera.

18. The camera of claim 17 wherein said current control means includes first and second two-state switching means, each having a first and a second power terminal and an output terminal and each being actuatable to make connection between said output terminal thereof and said first or said second power terminals thereof, said first power terminal of each said switching means connected to a first or one terminal of said battery, said second power terminal of each said switching means being connected to a second or other terminal of said battery, at least one of said system loads being connected between the output terminal of said first switching means and said one terminal of said battery, at least one other of said system loads being connected between the output terminal of said second switching means and said other terminal of said battery, said first switching means being actuated to connect said output terminal thereof in said unstable state to said second power terminal thereof, said second switching means being actuated in said unstable state to connect said output terminal thereof to said first power terminal thereof, so as to supply power from said battery to said system loads in said unstable state, said first and second switching means being actuated to their respective alternate states in said stable state so as to remove battery power from said loads, said switching means drawing practically no battery current in said respective alternate states thereof.

* * * * *

UNITED STATES PATENT AND TRADEMARK OFFICE
CERTIFICATE OF CORRECTION

PATENT NO. : 4,460,264
DATED : July 17, 1984
INVENTOR(S) : Arthur J. Winter

It is certified that error appears in the above-identified patent and that said Letters Patent is hereby corrected as shown below:

Column 18, line 35, "charged" should read -- discharged --.

Signed and Sealed this

Tenth Day of December 1985

[SEAL]

Attest:

DONALD J. QUIGG

*Attesting Officer*   *Commissioner of Patents and Trademarks*